Patented Jan. 1, 1935

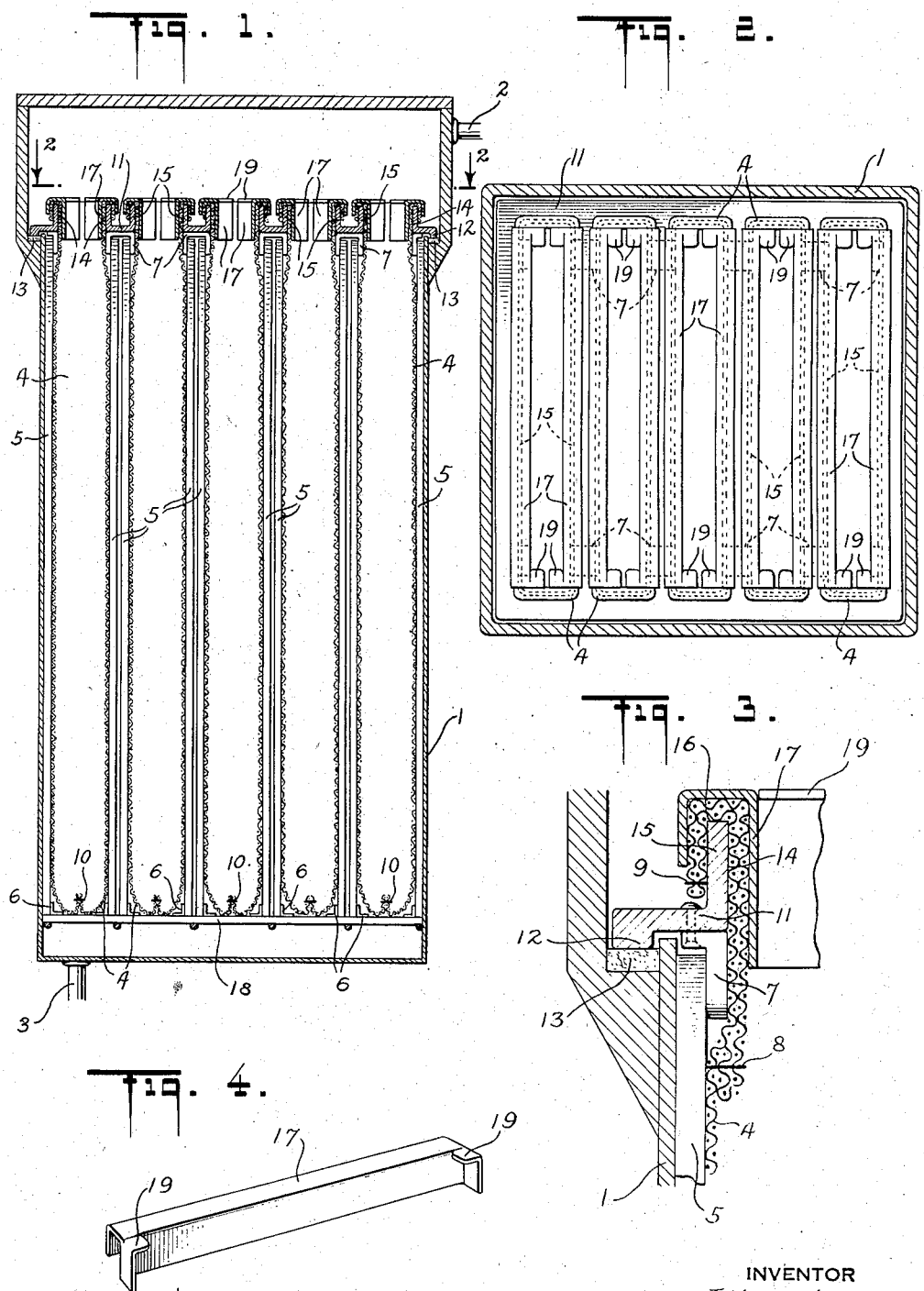

1,986,570

UNITED STATES PATENT OFFICE 1,986,570

FILTER

John Gans, Grymes Hill, Staten Island, N. Y., assignor to Columbia Appliance Corporation, New York, N. Y., a corporation of New York Application August 4, 1932, Serial No. 627,403

5 Claims. (Cl. 210—190)

The present invention relates to an improvement in filters which may be advantageously employed in connection with dry cleaning apparatus, or for other usual purposes. In dry cleaning practice wherein a liquid solvent is utilized to remove dirt from various kinds of objects, the articles or materials to be cleaned are commonly placed in the basket of a washing machine or the like and rotated through a supply of liquid solvent. In some forms of apparatus for this purpose, the solvent is continuously removed from the washer, filtered and then returned to the washer in equal volume. In other forms of apparatus, the supply of solvent is used in cleaning until it becomes so burdened with dirt and the like that it is no longer capable of effective use, whereupon the dirty solvent is drawn off in a batch, filtered and returned to the washing machine.

In many cases, whether related to the dry cleaning art or not, filtering is rendered more effective by employing what is well known as filter aid. This material is introduced into the solvent or other liquid to be filtered and is intended to pass therewith into the filter and to be intercepted by the filtering medium. In some types of filters, the filter aid serves merely to improve the filtering characteristic of the filtering medium, whereas in other types, it is intended also to plug up or reduce small passageways through which unfiltered material finds its way past edges of the filtering medium and thence into the stream of filtered material at the other side of the medium.

My invention is intended to be applied to the latter type and more particularly to embodiments thereof in which the filter consists in general of a casing having an inlet opening and an outlet opening between which is interposed a filter bag or bags usually of fabric or other suitable material.

An important factor in the efficiency of a filter of this type is the ease with which the filter bag may be removed, cleaned and replaced in effective filtering position. Another important factor is the cost of the filter bags so employed. In some forms of apparatus with which I am familiar, the filter bags are provided at their open end portions with inserted eyelets adapted to engage with suitable supporting or suspending devices. It is necessary, with this type of filter, to carefully fashion the upper end of the bag so that it may accurately fit the co-operating supporting members.

I have found that the construction of bags suited for this purpose and for use in filters of this type involves considerable expense in labor over the cost of the actual material employed. Moreover, unless the bags are constructed accurately and handled with great care, their use in filtering under pressure is frequently attended with leakage of unfiltered material past the joints between the bags and the member which supports them in operative position. It will be understood that, where filter aid is employed, any leakage of unfiltered liquid carries with it various quantities of filter aid depending on the amount suspended therein and other circumstances. While this escape of filter aid into the filtered liquid may not be important in some operations, it is undesirable in dry cleaning practice, particularly where the filtered solvent is returned continuously to the washing machine during washing operation. It has been found that a relatively small quantity of filter aid passing the filter will impair the effectiveness of the cleaning to the extent that it appears as a thin deposit of fine dust-like particles on the cleaned garments or other articles after they are dried. It has therefore been an object of my invention to provide a novel form of bag which may be made at low cost and supporting means therefor whereby when the bag is operatively mounted in the filter, leakage of unfiltered liquid past the bag joints is substantially avoided.

One embodiment of my invention is described in the following specification and illustrated in the drawing appended thereto and in which—

Figure 1 is a transverse longitudinal section of a liquid filter in which removable fabric bags are employed as the filtering medium;

Figure 2, a transverse section on the line 2—2 of Figure 1;

Figure 3, a fragmentary detail in section; and

Figure 4, a view in perspective of a form of bag retaining clip adapted for use in connection with the device illustrated.

Referring to the drawing, my invention is shown as applied to a filter comprising a casing 1 having an inlet 2 at its upper end and an outlet 3 at its lower end. Suitable filtering media are removably interposed between said inlet and said outlet. In the illustrated construction, the filtering media include bags 4 supported at their upper open ends by means hereinafter to be described and separated from each other and from adjacent side walls of the casing 1 by screens 5 and from the bottom wall by a screen 18. Suitable means, as angles 6 at the bottom and as lugs 7 on or co-operating with plate 11 at the top releasably retain said screens in operative position. As shown in Figure 1, two screens 5 are positioned between adjacent bags 4, whereas a single screen 5 separates each end bag from the side wall adjacent thereto.

For the purposes of my invention, the bags 4 are preferably made of a suitable fabric in tubular form. This is readily cut to the required length and a portion of one end thereof doubled back upon itself and secured in position by lines of stitching 8 and 9, Figure 3. The opposite end is closed by bringing the opposed end portions of the tube into engagement and securing them in closing position by a line of stitches 10. Relatively small bags made in this manner can be produced at a saving of 50% as compared to the cost of other types of bags of similar size and material.

Where the filter requires a plurality of bags as 4, they are conveniently held in operative position by a supporting member in the form of a plate 11 provided with a downwardly extending peripheral flange 12 which is seated upon a gasket 13 to prevent leakage around the edge of the supporting plate 11. The bags 4 engage with suitably shaped openings 14 in plate 11, said openings being surrounded by flanges 15 extending outwardly or upwardly from the plate at an angle to the plane of the opening 14. With the bag in the operative position as illustrated, its upper edge portion is bent outwardly across the upper peripheral edge of the flange 15 and then downwardly along the outer surface of said flange. The latter is formed with a relatively sharp corner or peripheral edge at 16, Figure 3.

Under some conditions of use, the construction thus far described will operate satisfactorily and without undue leakage past the joint between the bag 4 and the flange 15. Under other conditions, or to secure more effective sealing of this joint, I employ suitable removable fastening means for clamping or otherwise securing the open end of the bag to the flange 15. One form of such device is shown in Figure 4 as a clip 17 of U shaped cross sectional contour and preferably of resilient material, as sheet brass or the like. After the upper end of the bag has been bent over the edge of the flange as above described, the clip 17 is pressed into position as shown in Figure 3, thus securely pressing the upper portion of said bag into contact with contiguous surfaces of the flange 15 and particularly against the sharp corner or edge 16 thereof.

In operating a filter as above described, the liquid to be filtered is fed into the casing 1 through the inlet 2, preferably under pressure. If this liquid has suspended therein a supply of filter aid, some is forced into the several bags 4 and deposited on interior surfaces thereof. Other portions lodge against those ends or edges of the bags which overlap and engage the flanges 15, thus effectively sealing the joint between the bags and the flanges during the first several moments of operation so that practically no filter aid will pass to the discharge side of the bag at this point. As feeding of the liquid continues, the filtered or purified liquid is withdrawn or discharged through the outlet 3.

After a period of operation, varying with the amount of dirt or other material to be filtered from the liquid and with the amount of filter aid utilized in connection therewith, the accumulation of material inside the bags will reduce their filtering efficiency to a point where they must be removed and cleaned. Where pressure is employed, the material masses in the bags, frequently in such a way as to cause portions thereof to protrude or bulge laterally or outwardly into the screen mesh openings, thus practically locking the bags against endwise removal in relation to the enclosing means. Access is had to the interior of the filter by removing the top or cover plate. After lifting off the clips 17, as by means of the ears 19, the upper edges of the bags are released from flanges 15 and the plate 11 is removed, thus disengaging the upper edges of the screens 5 and freeing the end portions of the bags. It is now possible to manipulate the bags and screens in such a way that they are easily removed. To reset the filter, the screens are again placed with their lower ends retained by the angles 6 and their upper ends engaged and positioned by the lugs 7 of plate 11. Fresh bags are then inserted as above described.

It has been found in actual practice that bags made as hereinabove described, besides practically eliminating leakage of unfiltered liquid, when mounted as above described, may be cleaned more readily than other types of bags with which I am familiar. Moreover, being of simple tubular shape, they suffer no harmful distortion due to cleaning or shrinkage so that, altho relatively inexpensive to make, they remain useable practically as long as the constituent fabric retains its effective properties.

I claim:

1. In a filter for liquids, the combination of a casing having an inlet port and a discharge port, a plurality of filter bags removably positioned in said casing in liquid receiving relation to the inlet port, a screen arranged transversely in the casing and spaced from the bottom wall thereof, bag spacing screens resting on said transverse screen and removably interposed between adjacent bags, a bag supporting member mounted in the casing and spaced from the top wall thereof, positioning means on said transverse screen and arranged in guiding relation to bottom portions of said spacing screens, and positioning means forming part of said bag supporting member and engaging top portions of said spacing screens to releasably hold the screens in operative bag spacing relation.

2. A filter in which removable filter bags are employed comprising a casing having an inlet end and a discharge end, a filter bag supporting member removably positioned in the casing and spaced from the inlet end thereof, a foraminous partition arranged transversely in the casing and spaced from the discharge end thereof, a plurality of bag spacing screens between said supporting member and said partition, and screen positioning means on said supporting member and said partition respectively adapted to engage end portions of the screens to hold the latter in bag spacing relation.

3. A filter according to claim 2 and wherein two separate screens are interposed between adjacent bags.

4. A filter according to claim 2 and wherein the screen positioning means on the bag supporting member include projections extending toward the foraminous partition.

5. Filter apparatus comprising a casing, a bag supporting member removably positioned therein, a plurality of open end filter bags arranged with their open end portions detachably engaging said bag supporting member, separate screens interposed between adjacent bags, said bag supporting member having screen positioning means adapted to engage edge portions at one end of the screens to hold them in bag supporting relation and to disengage and release said screens when the bag supporting member is removed, and screen positioning means arranged to engage edge portions of said screens at the opposite ends thereof.

JOHN GANS.